J. M. DALY.
MECHANISM FOR TRANSPORTING VEHICLES IN CARS.
APPLICATION FILED FEB. 9, 1916.
1,243,141.
Patented Oct. 16, 1917.
2 SHEETS—SHEET 1.
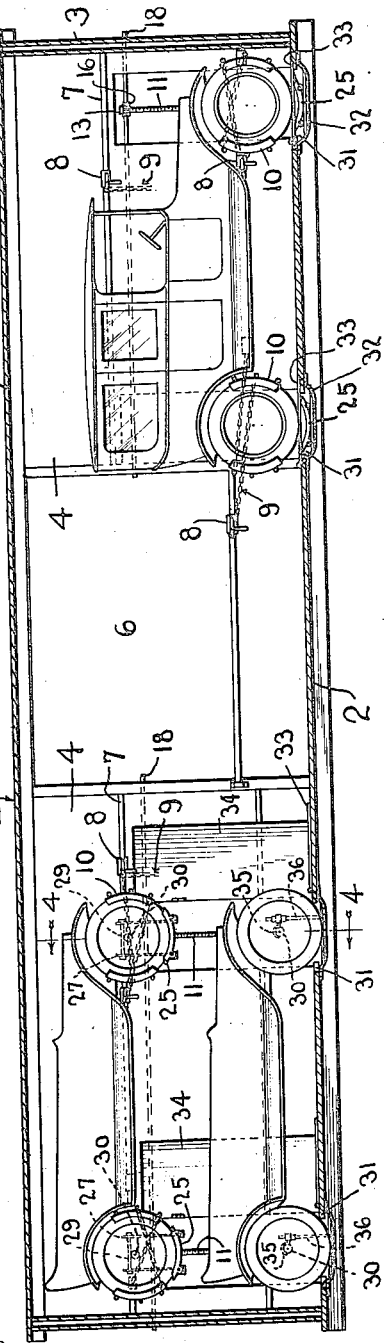
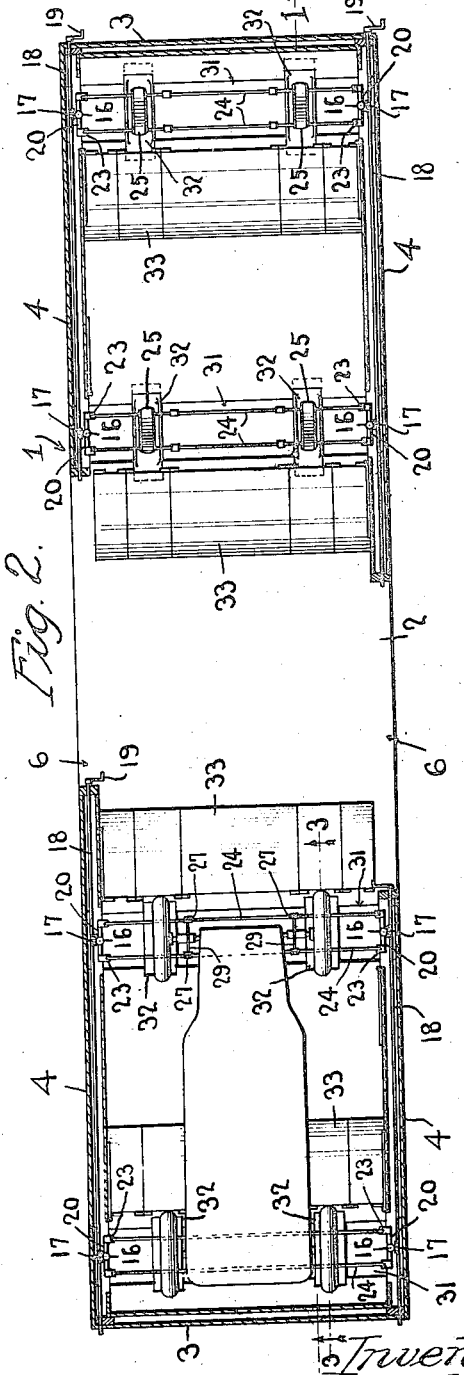
Witnesses:
Inventor:
John M. Daly

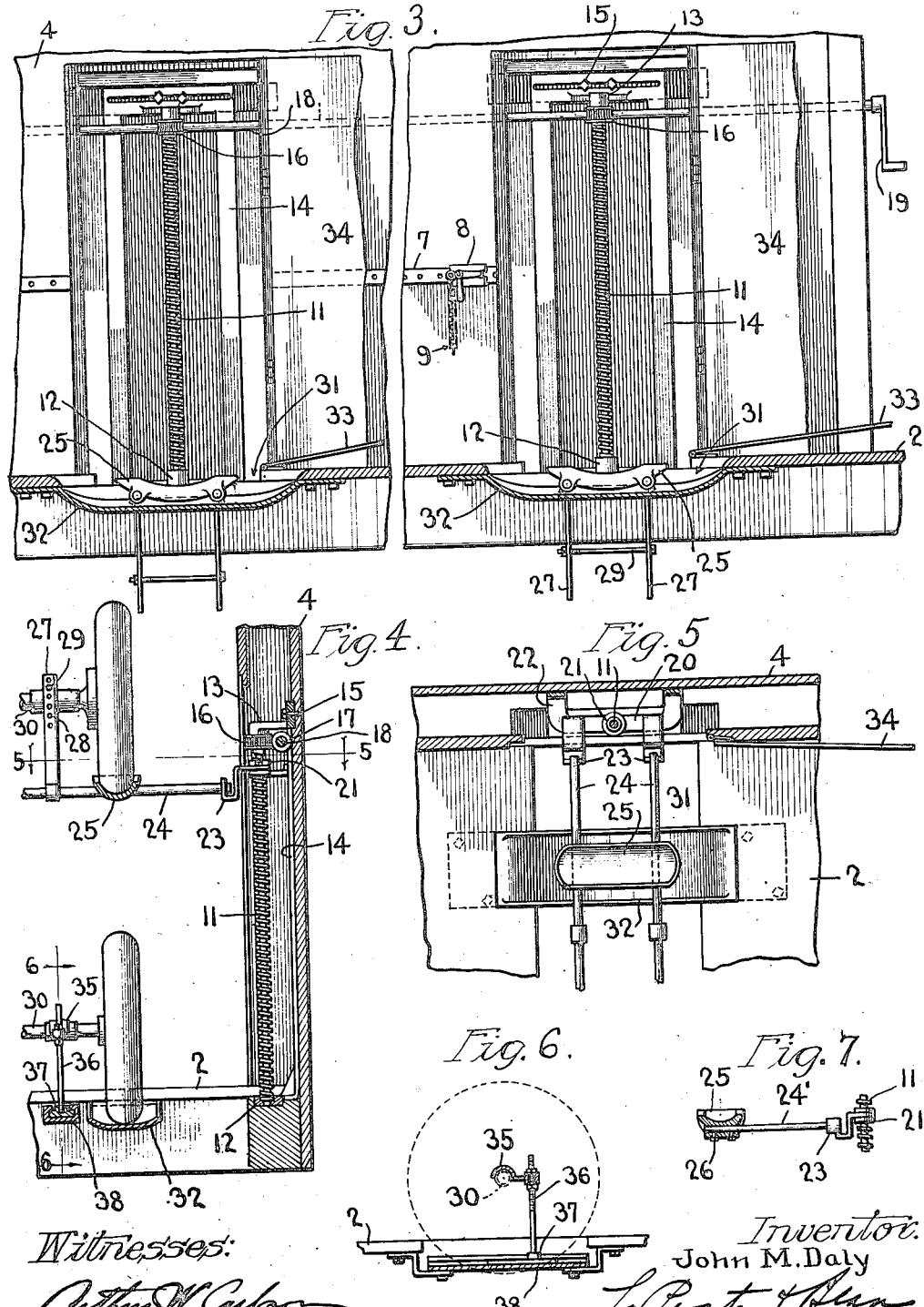

UNITED STATES PATENT OFFICE.

JOHN M. DALY, OF CHICAGO, ILLINOIS.

MECHANISM FOR TRANSPORTING VEHICLES IN CARS.

1,243,141.

Specification of Letters Patent.

Patented Oct. 16, 1917.

Application filed February 9, 1916. Serial No. 77,309.

*To all whom it may concern:*

Be it known that I, JOHN M. DALY, a citizen of the United States, a resident of Chicago, in the county of Cook and State of Illinois, have invented new and useful Improvements in Mechanism for Transporting Vehicles in Cars, of which the following is a specification.

This invention relates to improvements in mechanism for transporting vehicles in cars, and particularly to that type of apparatus which is disclosed and claimed broadly in a co-pending application on a method and apparatus for transporting vehicles filed Feb. 9th, 1916, Serial Number 77,308, which includes broadly, means adapted to engage the tires or wheels of the vehicles on both sides of the same, and having a connection with the side walls of the car, whereby they are securely held and braced against movement and also embodying means for raising and supporting a vehicle or vehicles or parts thereof in a suspended position so that one vehicle may be stacked over another to increase the effective capacity of the car.

It is the principal object of this invention to provide an improvement in the mechanism for raising the vehicle and supporting the same in its suspended position so that vehicles may be stacked in the cars and securely held against movement during transportation.

To the accomplishment of the foregoing and such other objects as may hereinafter appear, my invention consists in the construction, combination and arrangement of parts hereinafter described and then sought to be defined in the appended claims, reference being had to the accompanying drawings forming a part hereof and which show for the purpose of illustrative disclosure a preferred embodiment of my invention, it being understood that various changes may be made in practice within the scope of the claims without digressing from my inventive idea.

In the drawings,

Figure 1 represents a vertical longitudinal section of a car embodying my invention and showing vehicles arranged one above the other at one end and a single vehicle at the other;

Fig. 2 is a horizontal longitudinal section, a vehicle being indicated in plan at one end;

Fig. 3 is an inside elevation showing the construction of the jacks and associated mechanism for raising and supporting the vehicles;

Fig. 4 is a vertical section on line 4—4, Fig. 1, showing one of the jacks and associated mechanism for supporting the vehicle;

Fig. 5 is a horizontal section taken on line 5—5 of Fig. 4 showing the upper vehicle supporting means in plan;

Fig. 6 is a section taken substantially on line 6—6 of Fig. 4;

Fig. 7 is a view showing a slight modification.

Referring now to the drawings, the numeral 1 designates the car which is of standard construction, having the floor 2, ends 3, sides 4, roof 5 and door-way 6. The mechanism embodying my invention may be applied to cars of standard construction or the cars may be built with this mechanism therein.

The numeral 7 designates bar or track members on which are slidably arranged the locking boxes 8, having the chains 9 which engage the shoes 10 which fit the tires or wheels of the vehicle so as to hold the vehicle in position as disclosed in my co-pending application hereinbefore referred to.

In connection with this mechanism, I provide an improved form of raising and supporting means for the vehicle which includes the screw or worm 11 journaled between the spaced side walls of the car in the bearing members 12 and 13, these forming part of the supporting frame 14 which is slidably mounted within the space between the inner and outer side walls and adjustably held in position by means of the bolt and slot connection 15. At the upper end of this screw member 11 I provide a worm wheel 16 which is driven by means of the worm 17 on shaft 18, which extends longitudinally of the car, preferably between the inner and outer walls of the sides thereof and adapted to be driven by power if desired, or manually, by means of the crank 19.

While I have shown one shaft operating a plurality of screw members 11, it is obvious that each of the screw members may be operated separately, if desired.

The head member 20 is provided with the threaded sleeve 21, which meshes with the screw member 11 so that as the screw member is operated the head member will be raised and lowered. This head member has the rearwardly extending guiding and bracing members 22 and the forwardly extending brackets or arms 23, said brackets or arms being adapted to support the rods or bars 24, whereby a pair of spaced supporting members is provided. On these supporting members is positioned the shoe 25 which fits the tire or wheel of the vehicle.

While I have shown in Fig. 2 that these supporting rods or bars 24 extend transversely across the car, to the corresponding arms or brackets 23, of the jack on the opposite side of the car it is within my invention to provide these supporting arms or bar in short lengths as at 24′ in Fig. 7 and also to provide the shoe 25 with means for adjustment 26 whereby its position on the bars or rods 24 and 24′ may be varied.

I also provide means for holding or clamping the wheel of the vehicle in position on the shoe 25, shown in Figs. 1, 2 and 4 as the upwardly extending arms 27 having apertures 28 through which passes the bolt 29 connecting the two arms together, which bolt is positioned on top of the axle 30 of the vehicle.

In installing this mechanism, I cut out part of the floor as indicated at 31, and mount therein the socket member 32 which is curved as shown and is adapted to receive the supporting bars or rods 24 and shoes 25 when in their lowermost position, the cover member 33 being placed thereover so that the bottom of the car is uninterrupted by openings, and suitable for use for merchandise of various kinds. The openings in the side walls of the car are similarly provided with the doors 34.

Referring now particularly to Fig. 1, it is seen that I have braced a single vehicle in the right hand end of the car by means of the shoes and coöperating bracing mechanism as described in my co-pending application hereinbefore referred to. However, at the left hand side of the car I have indicated an arrangement of vehicles in two tiers or one above the other. The upper vehicle is supported by means of the jacks, bars or rods 24 and shoes 25 and held against vertical movement by the clamping means on the axle and against forward or rearward movement by means of the shoes 10 and connections 9 to the locking boxes 8. After this car is raised, the second car is positioned therebelow, the wheels thereof fitting in the socket members 32. Means is also provided to engage the axle thereof to prevent movement, this being shown in the form of the arm 35 adjustably mounted on the rod 36 which is secured to the sliding member 37 mounted in a guide-way 38, whereby it may have a sliding movement but be held against vertical movement. The shoes, flexible connections and locking boxes may also be used in connection with this structure.

What I claim is:

1. An apparatus for storing vehicles in a railroad car, including in combination, a plurality of means for raising the vehicles within the car arranged in pairs on opposite sides thereof and having supporting members connected thereto, means on said supporting members for engaging the wheels of the vehicle and means for engaging the axles of the vehicles to clamp the same in position.

2. An apparatus for storing vehicles in a railroad car, including in combination, a plurality of means for raising the vehicles within the car arranged in pairs on opposite sides thereof and having supporting members connected thereto, means on said supporting members for engaging the wheels of the vehicle and means for engaging the axles of the vehicles to clamp the same in position, and bracing means adjustably secured to the sides of the car and adapted to engage the wheels of a vehicle.

3. An apparatus for storing vehicles in a railroad car, including in combination, a plurality of means for raising the vehicles within the car arranged in pairs on opposite sides of the car and having supporting members connected thereto, said supporting members extending from one raising means to the other and arranged in pairs, means on said supporting means for engaging the wheels of the vehicle and means on said supporting means for engaging and clamping the axles of the vehicles.

4. An apparatus for storing vehicles in a railroad car, including in combination, a plurality of means for raising the vehicles within the car, said raising means being adjustably mounted therein so as to be capable of accommodating vehicles of different lengths, supporting means connected to said raising means and adapted to engage the wheels of the vehicles.

5. An apparatus for storing vehicles in a railroad car, including in combination, a car having a floor, sides, ends and roof, parts of the floor being cut away to provide recesses, a plurality of means for raising vehicles within the car, said raising means having supporting means connected thereto and extending transversely across the car, said supporting means being positioned in said recesses when in their lowermost position.

6. An apparatus for storing vehicles in a railroad car, including in combination, a car having a floor, sides, ends and roof, parts the floor being cut away to provide recesses, a plurality of means for raising vehicles within the car, said raising means having supporting means connected thereto and extending transversely across the car, said supporting means being positioned in said recesses when in their lowermost position, said raising means being positioned within the side walls of the car, whereby the car may be used as an ordinary merchandise and freight car and also as a vehicle car.

7. An apparatus for storing vehicles in a railroad car, including in combination, a car having a floor, side walls, ends and roof, parts of the floor being cut away transversely and having socket members mounted therein and a cover therefor, a plurality of raising means for raising vehicles within the car, supporting members connected to said raising means and extending transversely of the car and being adapted to be positioned within said recesses and socket members when in their lowermost position, said socket members serving to receive the wheels of a vehicle, so that a plurality of vehicles may be supported one above the other in the car.

8. An apparatus for storing vehicles in a railroad car, including in combination, a car having a floor, side walls, ends and roof, parts of the floor being cut away transversely and having socket members mounted therein and a cover therefor, a plurality of raising means for raising vehicles within the car, supporting members connected to said raising means and extending transversely of the car and being adapted to be positioned within said recesses and socket members when in their lowermost position, said socket members serving to receive the wheels of a vehicle, so that a plurality of vehicles may be supported one above the other in the car, and means for engaging and clamping the axles of the vehicles, and means for bracing the vehicles against movement including bracing members engaging the wheels and connected to the sides of the car.

9. An apparatus for storing vehicles in a car, including in combination, a car having a floor, sides, ends, and roof, part of the floor being cut away to provide a recess, means for raising vehicles within the car, said raising means having supporting means connected thereto, said supporting means being positioned in said recess when in its lowermost position.

10. An apparatus for storing vehicles in a car, including in combination, a car having a floor, sides, ends and roof, part of the floor being cut away to provide a recess, means for raising vehicles within the car, said raising means having supporting means connected thereto, said supporting means being positioned in said recess when in its lowermost position, and said raising means being mounted within the sides of the car.

11. An apparatus for storing vehicles in a car, including in combination, a car having a floor, ends, roof and double side walls spaced apart, raising means mounted within said spaced side walls, said raising means including an operating shaft, a worm member geared thereto, a follower mounted to move on said worm member and supporting means connected to said follower.

12. An apparatus for storing vehicles in a car, including in combination, a car having a floor, ends, roof and double side walls spaced apart, raising means mounted in pairs on opposite sides of the car within said spaced side walls, said raising means including an operating shaft, a worm member geared thereto, a follower mounted to move on said worm member and supporting means connecting the follower on the opposed raising means.

13. An apparatus for storing vehicles in a car, including in combination, a car having a floor, ends, roof and double side walls spaced apart, raising means mounted within said spaced side walls, said raising means including a supporting frame adjustably secured to the side walls of the car and having a worm mounted to rotate therein, an operating shaft geared to said worm, a follower member mounted to move on said worm, and supporting means connected to said follower member.

JOHN M. DALY.